United States Patent Office 3,181,017
Patented Apr. 27, 1965

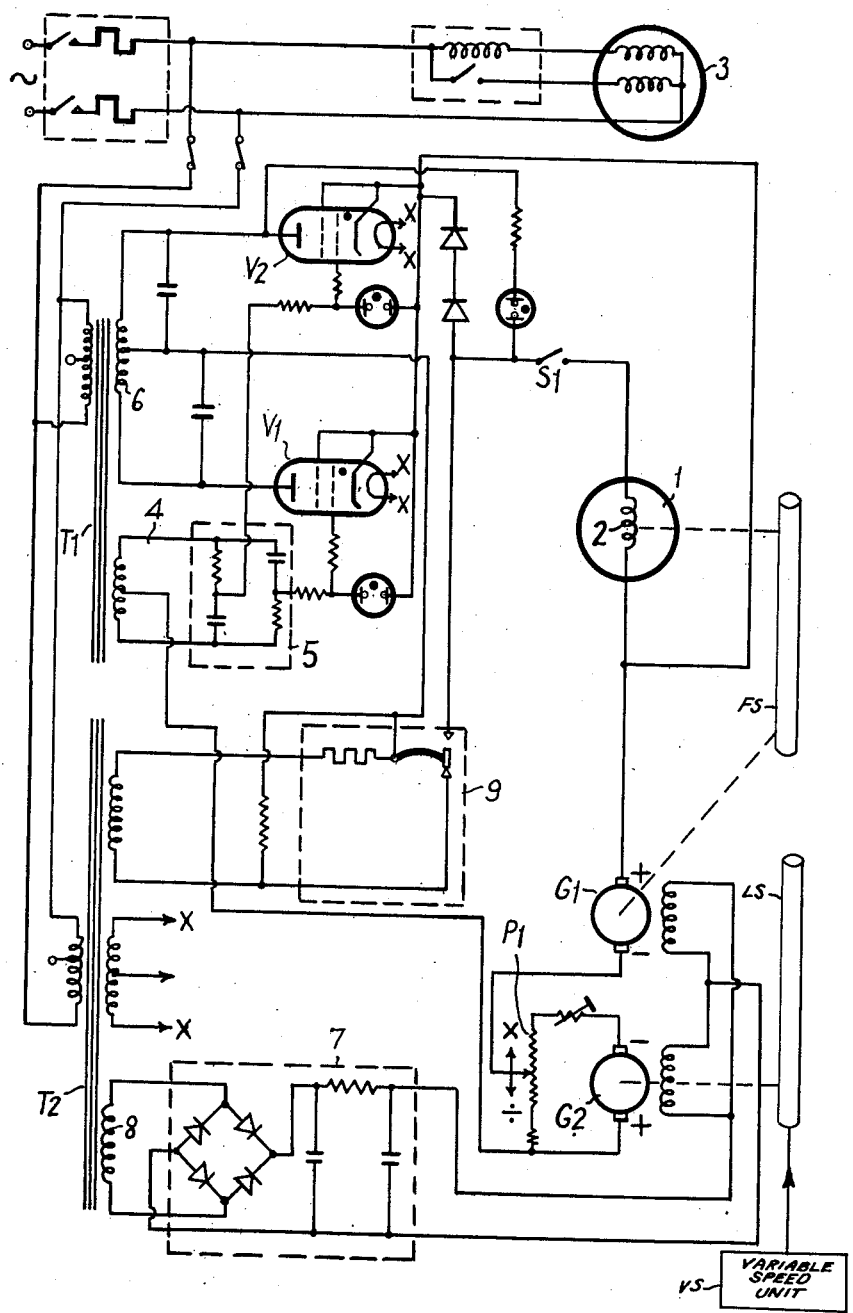

3,181,017
SPEED CONTROL SYSTEM
Norman R. Bancroft, Cambridge, England, assignor to Pye Limited, Cambridge, England, a British company
Filed Jan. 12, 1961, Ser. No. 82,267
Claims priority, application Great Britain, Jan. 22, 1960, 2,409/60
2 Claims. (Cl. 310—95)

The present invention relates to a speed control system for controlling the speed of rotation of a member as a proportion of the speed of rotation of another member, serving as a master or reference.

According to the present invention, the member whose speed of rotation is to be controlled is driven through an electromagnetic coupling device the speed of which is controlled by varying the excitation of an exciter coil of the coupling, and this excitation is in turn controlled in dependence upon the relationship between the speed of rotation of the member to be controlled and the speed of rotation of a master drive member so as to maintain the speed of rotation of the controlled member at a desired proportion of the speed of rotation of the master drive member despite variations in the speed of rotation of the master drive member. The speed of rotation of the master drive member may be variable either in a continuous manner, or in steps, for example it may constitute or be driven from the output of either a hydraulic or electrical variable speed unit, or a gear box.

It will be understood that the proportion of the speed of rotation of the master drive member at which the controlled member rotates may be either less than unity, unity, or greater than unity.

According to a feature of the invention, means are provided for producing a potential proportional to the speed of rotation of the master drive member and this potential or a proportion thereof may serve as a speed reference potential against which a further potential proportional to the speed of rotation of the member to be controlled is measured, the relationship between these two potentials controlling the degree of excitation of the coupling device to maintain the member to be controlled rotating at the desired proportion of the speed of rotation of the master drive member.

According to a further feature of the invention, the master drive member drives a generator producing a potential proportional to its speed of rotation and a further generator is driven by the member to be controlled and produces a potential according to its speed of rotation. The potential produced by the first generator is applied across a potentiometer the position of the slider of which controls the excitation of the coupling device and hence determines the proportion of the speed of the master drive member at which the member to be controlled will run. The potential from the second generator is applied with reverse polarity to back off the potential from the first generator. The two generators preferably comprise D.C. generators the fields of which are fed from a constant voltage D.C. supply.

In order that the invention may be more fully understood, an embodiment thereof will now be described with reference to the accompanying drawing which is a circuit diagram of one form of speed control arrangement according to this invention.

Referring to the drawing, the circuit to be described is particularly intended for controlling the speed of rotation of the feed shaft of a lathe so that it is an adjustable proportion of the live spindle speed of the lathe and the speeds can be held to that proportion regardless of variations in the spindle speed, within the limits of the system.

The circuit comprises an electromagnetic induction coupling device 1 (which may be of the kind described in my copending application No. 826,028, filed July 9, 1959), having an exciter coil 2 and the input shaft of which is driven by a split-phase induction motor 3. The output shaft of the coupling in turn drives the feed shaft FS of the lathe. Energisation of the coupling exciter coil is controlled through the switch S1. The exciter coil 2 of the coupling is fed via S1 and the thermal delay device 9, with a D.C. current obtained from a full-wave thyratron rectifier arrangement V1 and V2. The grid firing angle of these thyratrons is controlled both by an A.C. bias and by a D.C. bias. The A.C. bias is derived from the secondary winding 4 of the transformer T1 and is applied to the grids of the thyratrons V1 and V2 through the phase shift network 5 such that the grid potentials of the thyratrons are shifted 90° in phase with respect to the anode voltage supplied from the secondary winding 6 of the transformer T1. When the alternating grid bias curve crosses the critical cathode/grid voltage curve during the positive half cycle of anode voltage the thyratrons will fire. Once conduction has been initiated it continues for the rest of the positive half cycle of anode voltage. The thyratrons are also biassed by a D.C. voltage derived from the potentiometer P1. This potentiometer is connected across the output of a D.C. generator G2 which is driven by the lathe spindle LS which constitutes the master drive member, and hence produces an output voltage which is proportional to the speed of rotation of the spindle. This output voltage of G2 constitutes a speed reference potential with which can be compared the potential of the generator G1 rotated by the feed shaft driven by the induction coupling 1. The output voltage from the generator G1 is connected to the slider of the potentiometer P1 so as to back off the reference voltage produced by the generator G2. The D.C. bias applied to the thyratrons is therefore adjusted by variation of the slider of the potentiometer P1 so that the excitation of the coil 2 of the coupling 1 is such as to cause the feed shaft to be driven at the desired proportion of the speed of rotation of the lathe spindle. The lathe spindle is driven through a variable speed unit VS which may be a hydraulic or electrical continuously variable unit of a gear box.

The fields of both generators G1 and G2 are fed from a constant voltage D.C. supply produced by the rectifier network 7 from the secondary 8 of the transformer T2. This ensures that variations in the output of the generator are proportional only to variations in the speed of their respective driving shafts.

It will be appreciated that if the speed of rotation of the lathe spindle is varied, the voltage output from the generator G2 will vary in direct proportion to the change in speed, which will in its turn vary the D.C. bias fed to the thyratrons V1, V2 and hence the excitation applied to the induction coupling 1. The speed of the feed shaft will thus be varied in direct proportion to the change which has occurred in the speed of the lathe spindle. The actual speed of rotation of the feed shaft as a proportion of the speed of rotation of the lathe spindle is adjusted by varying the setting of the slider of the potentiometer P1.

If a variation in the speed of rotation of the lathe spindle results in the voltage fed to the thyratrons being less than the minimum or greater than the maximum that may be backed off by the generator G1 then the system will run at the boundary value of speed, that is to say at its limit value which is nearest to the desired value of speed represented by the voltage.

Whilst the invention has been particularly described for controlling the speed of rotation of the feed shaft of a lathe as an adjustable proportion of the lathe spindle speed, it will be understood that it may be employed in any mechanism where it is desired to control the speed of rotation of one member as a proportion of the speed of rotation of another member. Moreover instead of employing a thyratron circuit for energising the exciter coil of the coupling, semiconductor controlled rectifiers may be used, in which case the circuit may be as described in application No. 151,977, filed November 13, 1961, in the name of E. H. A. Prescott.

I claim:

1. A speed control system for controlling the speed of rotation of a first member as a proportion of the speed of rotation of a second member serving as a reference comprising an electromagnetic coupling device having an exciter coil, means for driving said first member in rotation from said electromagnetic coupling device, a bias controlled rectifier circuit for energising the exciter coil of said coupling device, a first D.C. generator driven by the rotation of said first member, a second D.C. generator driven by the rotation of said second member, a potentiometer having an adjustable tapping connected across the output of said second generator, a constant voltage supply fed to energise said first and second generators, means connecting the output potential from said first generator to the adjustable tapping on said potentiometer to back off the potential of said second generator and means for feeding the voltage of said adjustable tapping of said potentiometer through said first generator to the rectifier circuit so that the rectifier circuit is controlled according to the bias produced from said potentiometer and in turn controls the excitation of the coupling device to maintain the speed of rotation of the first member as a desired proportion of the speed of rotation of the second member.

2. A speed control system for controlling the speed of rotation of a first member as a proportion of the speed of rotation of a second member serving as a reference, comprising an electromagnetic coupling device having an exciter coil, means for driving said first member in rotation from said electromagnetic coupling device, a bias controlled full-wave thyratron rectifier circuit for energising the exciter coil of said coupling device, means for applying an A.C. bias voltage to the grids of said thyratrons, a first generator driven by the rotation of said first member, a second generator driven by the rotation of said second member, a potentiometer having an adjustable tapping connected across the output of said second generator, a constant voltage supply fed to energise said first and second generators, means connecting the output potential from said first generator to the adjustable tapping of said potentiometer to oppose the output potential of said second generator, and means for feeding the voltage at said adjustable tapping of said potentiometer through the first generator to the rectifier circuit so that the rectifier circuit is controlled according to the bias produced from said potentiometer and in turn controls the excitation of the coupling device to maintain the speed of rotation of the first member as a desired proportion of the speed of rotation of the second member.

References Cited by the Examiner
UNITED STATES PATENTS

| | | | |
|---|---|---|---|
| 2,414,524 | 1/47 | Harris | 318—7 |
| 2,744,213 | 5/56 | Jaeschke | 317—6 |
| 3,024,395 | 3/62 | Pedersen | 318—71 |
| 3,061,748 | 10/62 | Fehn | 310—98 |

MILTON O. HIRSHFIELD, *Primary Examiner.*

DAVID X. SLINEY, *Examiner.*